(12) United States Patent  
Sun et al.

(10) Patent No.: US 11,798,193 B2  
(45) Date of Patent: Oct. 24, 2023

(54) MULTI-DIMENSIONAL IMAGE DETECTION ON AT LEAST TWO ACQUIRED IMAGES

(71) Applicant: Beijing Baidu Netcom Science and Technology Co., Ltd., Beijing (CN)

(72) Inventors: Lei Sun, Beijing (CN); Bin Hu, Beijing (CN); Siyue Rao, Beijing (CN)

(73) Assignee: BEIJING BAIDU NETCOM SCIENCE AND TECHNOLOGY CO., LTD., Beijing (CN)

(*) Notice: Subject to any disclaimer, the term of this patent is extended or adjusted under 35 U.S.C. 154(b) by 330 days.

(21) Appl. No.: 17/211,001

(22) Filed: Mar. 24, 2021

(65) Prior Publication Data

US 2021/0209802 A1 Jul. 8, 2021

(30) Foreign Application Priority Data

Jul. 21, 2020 (CN) .......................... 202010705042.0

(51) Int. Cl.
*G06T 7/90* (2017.01)
*G06T 7/00* (2017.01)
(Continued)

(52) U.S. Cl.
CPC .................. *G06T 7/90* (2017.01); *G06T 7/97* (2017.01); *G06V 10/809* (2022.01); *G06V 10/82* (2022.01);
(Continued)

(58) Field of Classification Search
CPC ... G06T 7/90; G06T 7/97; G06T 2207/20081; G06T 7/0002; G06T 2207/10004;
(Continued)

(56) References Cited

U.S. PATENT DOCUMENTS 10,109,051 B1  10/2018  Natesh et al.
2014/0198328 A1* 7/2014 Katayama ............ G06K 15/027
                                              358/1.9
(Continued)

FOREIGN PATENT DOCUMENTS

CN    105096350    11/2015
CN    105373768     3/2016
(Continued)

OTHER PUBLICATIONS

Japanese Decision to Grant a Patent JP 2021-048278 (dated Mar. 23, 2022) (5 pages).
(Continued)

*Primary Examiner* — Christopher Wait
(74) *Attorney, Agent, or Firm* — NORTON ROSE FULBRIGHT US LLP

(57) ABSTRACT

An image detection method and apparatus, an electronic device and a storage medium are provided, which relate to the fields of artificial intelligence, deep learning and image processing. The image detection method comprises: performing an acquisition processing on a to-be-detected imaging image to obtain an acquired image; extracting feature data of a target object in the acquired image through a preset image detection network in response to detection processing; performing a multi-dimensional detection comprising at least an imaging content indicator and a color bar indicator on the feature data of the target object according to the image detection network to obtain a detection result; wherein the target object includes imaging contents and color bars which are used to describe color information related to the imaging contents.

16 Claims, 5 Drawing Sheets

(51) Int. Cl.
*G06V 10/80* (2022.01)
*G06V 10/82* (2022.01)
*G06V 20/10* (2022.01)
*G06V 40/16* (2022.01)
*G06V 10/25* (2022.01)
*G06V 10/56* (2022.01)
*G06V 10/98* (2022.01)

(52) U.S. Cl.
CPC ............ *G06V 20/10* (2022.01); *G06V 40/162* (2022.01); *G06T 2207/20081* (2013.01); *G06V 10/25* (2022.01); *G06V 10/56* (2022.01); *G06V 10/993* (2022.01); *G06V 40/161* (2022.01)

(58) Field of Classification Search
CPC ........... G06T 2207/20084; G06T 2207/30201; G06V 10/82; G06V 20/10; G06V 40/162; G06V 10/25; G06V 10/56; G06V 10/993; G06V 40/161; G06F 18/254; G06F 18/2413; G06N 3/045; G06N 3/08
See application file for complete search history.

(56) References Cited

U.S. PATENT DOCUMENTS

2017/0329775 A1* 11/2017 Honjo .................. G06T 7/90
2018/0052052 A1   2/2018 Yasutaka et al.

FOREIGN PATENT DOCUMENTS

| CN | 107909580 | 4/2018 |
| CN | 110472600 | 11/2019 |
| CN | 111295669 | 6/2020 |
| JP | 05-103336 | 4/1993 |
| JP | 2017-204241 | 11/2017 |
| WO | WO 2005/124302 | 12/2005 |
| WO | WO 2018/012136 | 1/2018 |

OTHER PUBLICATIONS

Extended European Search Report EP 21170755.9 (dated Oct. 20, 2021) (9 pages).
Office Action issued in corresponding Chinese Application No. 202010705042, dated May 12, 2023.

* cited by examiner

MULTI-DIMENSIONAL IMAGE DETECTION ON AT LEAST TWO ACQUIRED IMAGES

CROSS-REFERENCE TO RELATED APPLICATION

This application claims priority to Chinese patent application No. 202010705042.0, filed on Jul. 21, 2020, which is hereby incorporated by reference in its entirety.

TECHNICAL FIELD

The present disclosure relates to the field of computer vision processing, in particular to the fields of artificial intelligence, deep learning and image processing, and may be applied to the fields of image acquisition, image detection and the like that are related to image processing.

BACKGROUND

In computer vision, for image processing, with increasing demand of users for monitoring various scenes such as security, road conditions and the like and for definition and accuracy of images output by acquisition devices such as cameras, car machines and the like, as well as more intelligent electronic devices such as portable devices, mobile phone terminals and the like than before, and stronger image analysis ability of chips, the users wish that higher definition and higher accuracy of the acquired image for image processing can be achieved.

SUMMARY

The present disclosure provides an image detection method and apparatus, an electronic device and a storage medium.

In an aspect of the present disclosure, there is provided an image detection method, comprising:
  performing an acquisition processing on a to-be-detected imaging image to obtain an acquired image;
  extracting feature data of a target object in the acquired image through a preset image detection network in response to detection processing; and
  performing a multi-dimensional detection comprising at least an imaging content indicator and a color bar indicator on the feature data of the target object according to the image detection network to obtain a detection result,
  wherein the target object comprises imaging contents and color bars which are used to describe color information related to the imaging contents.

In another aspect of the present disclosure, there is provided an image detection apparatus, comprising:
  an acquisition module configured to perform an acquisition processing on a to-be-detected imaging image to obtain an acquired image;
  a response module configured to extract feature data of a target object in the acquired image through a preset image detection network in response to detection processing; and
  a detection module configured to perform a multi-dimensional detection comprising at least an imaging content indicator and a color bar indicator on the feature data of the target object according to the image detection network to obtain a detection result,
  wherein the target object comprises imaging contents and color bars which are used to describe color information related to the imaging contents.

In another aspect of the present disclosure, there is provided an electronic device, comprising:
  at least one processor; and
  a memory communicatively connected with the at least one processor; wherein,
  the memory is configured to store instructions executable by the at least one processor to enable the at least one processor to implement the method provided in any one of the embodiments of the present disclosure.

In another aspect of the present disclosure, there is provided a non-transitory computer-readable storage medium storing computer instructions for causing the computer to perform the method provided in any one of the embodiments of the present disclosure.

It should be understood that the content described in this section is intended neither to identify the key or important features of the embodiments of the present disclosure, nor to limit the scope of the present disclosure. Other features of the present disclosure will be easily understood from the following description.

BRIEF DESCRIPTION OF THE DRAWINGS

The accompanying drawings are provided for better understanding of the solution, rather than limiting the present disclosure in which.

DETAILED DESCRIPTION

Exemplary embodiments of the present disclosure are described below with reference to the accompanying drawings, comprising various details of the embodiments of the present disclosure to facilitate understanding, and they should be considered as merely exemplary. Thus, it should be realized by those of ordinary skill in the art that various changes and modifications can be made to the embodiments described here without departing from the scope and spirit of the present disclosure. Also, for the sake of clarity and conciseness, the contents of well-known functions and structures are omitted in the following description.

The term "and/or" herein is only an association relationship that describes associated objects, which means that there may be three relationships, for example, A and/or B, may mean three situations comprising that only A exists, A and B exist at the same time, and only B exists. The term "at least one" herein means any one or any combination of at least two of the multiple, for example, comprising at least one of A, B, C, may mean comprising any one or more elements randomly selected from a set composed of A, B, and C. The terms "first" and "second" herein refer to a plurality of similar technical terms and distinguish them, and do not limit orders or limit only two, for example, a first feature and a second feature means that there are two types/two features, there may be one or more first features, and there may be one or more second features.

In addition, in order to better explain the present disclosure, numerous specific details are given in the following specific embodiments. Those skilled in the art should understand that the present disclosure may also be implemented without some specific details. In some examples, methods, means, elements and circuits well known to those skilled in the art have not been described in detail in order to highlight the main point of the disclosure.

Figure 1:
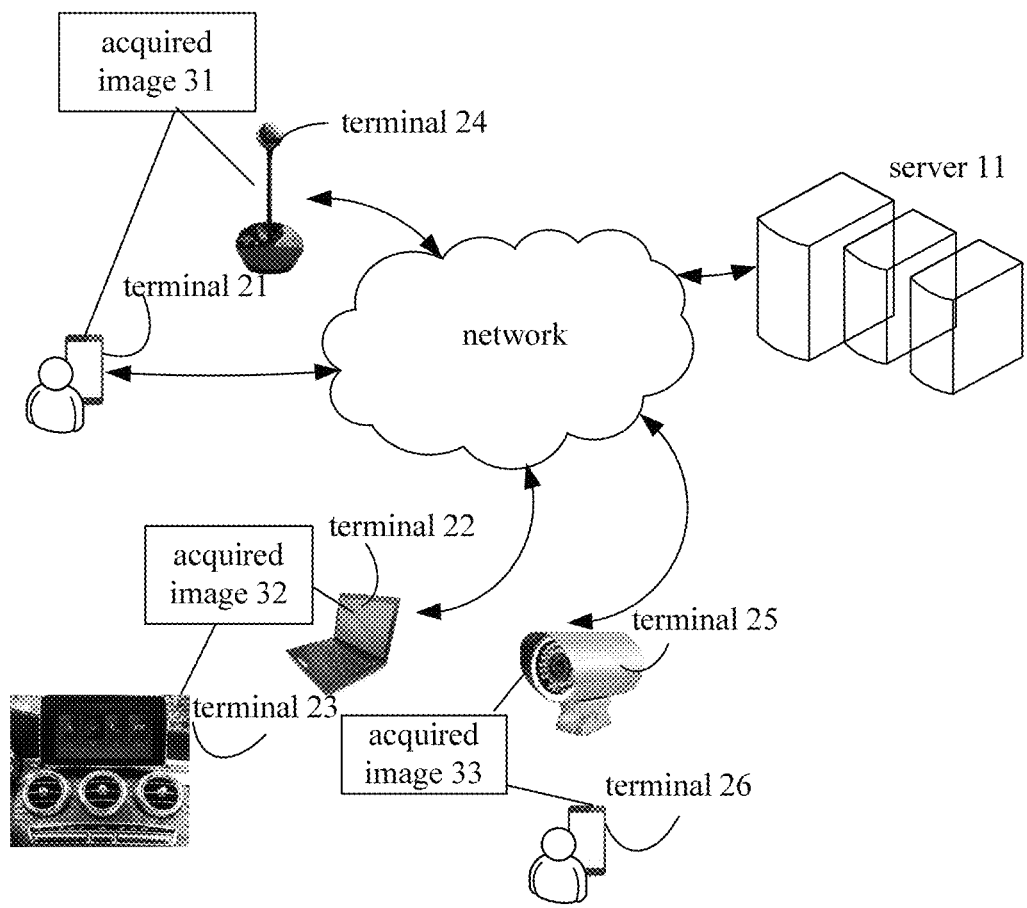
FIG. 1 is a schematic diagram of hardware entities for image detection interaction applied to an embodiment of the present disclosure.

FIG. 1 is a schematic diagram of hardware entities for image detection interaction applied to an embodiment of the present disclosure. FIG. 1 shows: a server 11 (for example, a server cluster composed of multiple servers), various terminals (terminals 21-26) such as PCs, mobile phones, all-in-ones, cameras, cameras with microphones and car machines, and various acquired images (acquired images 31-33) on which various hardware entities can perform image detection and which may be shared by various hardware entities with each other.

Each terminal may use a module in a local image processing chip, such as a detection module based on an image detection network, to perform a multi-dimensional detection comprising at least an imaging content indicator and a color bar indicator to obtain a detection result.

Each terminal may also provide various acquired images to the background for cloud processing. During the cloud processing, a multi-dimensional detection comprising at least an imaging content indicator and a color bar indicator may be performed based on the image detection network to obtain a detection result. Each terminal may carry out the interaction of each acquired image with the server 11 through a wired network or a wireless network.

The foregoing example in FIG. 1 is only an example of a system architecture for implementing the embodiment of the present disclosure, and the embodiment of the present disclosure is not limited to the foregoing system architecture shown in FIG. 1. Based on this system architecture, various embodiments of the present disclosure are provided.

An acquisition device comprises a camera or a car machine. Taking the acquisition device as a camera as an example, in order to achieve the purpose of improving detection accuracy of image detection, it is necessary to detect an image of an imaging image output by the camera or car machine from two aspects of imaging content and color. In the detection process of "imaging content+color" acquired by the camera, either the detection of "imaging content+color" acquired by the camera can be realized, but it is necessary to set a specific detection environment, and construction and maintenance cost of the detection environment is very high, which leads to a sharp increase in detection cost; either only one of the "imaging content+color" acquired by the camera can be detected, and such incomplete detection data leads to insufficient detection accuracy; either, for the detection of "imaging content+color" acquired by the camera, hardware-in-loop detection cannot be realized, a simulated image obtained by simulating the real acquired image is detected, and the detection accuracy is not enough as real detection data cannot be obtained. The hardware-in-loop refers to using real image acquired by the camera.

Figure 2:
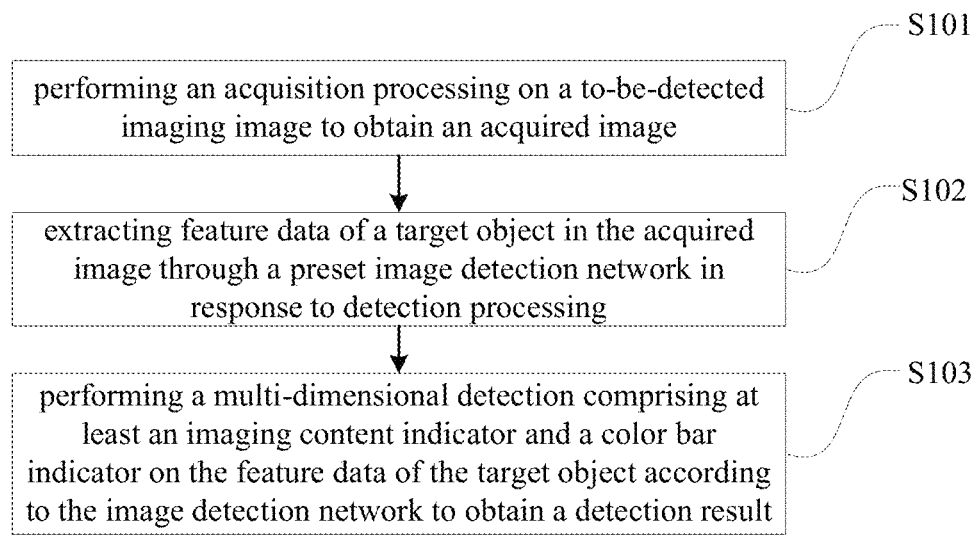
FIG. 2 is a schematic flowchart of an image detection method according to an embodiment of the present disclosure.

According to an embodiment of the present disclosure, an image detection method is provided. FIG. 2 is a schematic flowchart of an image detection method according to an embodiment of the present disclosure. The method may be applied to an image detection apparatus, for example, the apparatus may be deployed in a terminal or server or other processing equipment to perform video frame extraction, exposure quality statistics, exposure quality evaluation, etc. The terminal may be a user equipment (UE), a mobile device, a cellular phone, a cordless phone, a personal digital assistant (PDA), a handheld device, a computing device, a vehicle-mounted device, a wearable device, etc. In some possible implementations, the method may also be implemented in a manner in which a processor calls computer-readable instructions stored in a memory. As shown in FIG. 2, the method comprises the following steps.

S101: performing an acquisition processing on a to-be-detected imaging image to obtain an acquired image.

In one example, the acquisition processing may be performed by an acquisition device such as a camera or a car machine to obtain an acquisition result.

S102: extracting feature data of a target object in the acquired image through a preset image detection network in response to detection processing.

In one example, the image detection network may be a convolutional neural network, and the present disclosure is not limited to this type of network, any neural network that can realize the image detection of the present disclosure is within the protection scope of the present disclosure. There is a need for the image detection network to be trained in advance, and then the acquired image is input into the trained preset image detection network for image detection, and an output of the image detection network is the desired detection result.

In the process of using the trained preset image detection network to realize detection, the feature data of the target object in the acquired image may be first extracted. The target object comprises imaging contents and color bars which are used to describe color information related to the imaging contents, and then the feature data of the target object comprises at least feature data in two dimensions of imaging content and color bar. Then, identification and comparison can be performed based on the feature data in the two dimensions of imaging content and color bar to complete the image detection process.

S103: performing a multi-dimensional detection comprising at least an imaging content indicator and a color bar indicator on the feature data of the target object according to the image detection network to obtain a detection result.

In one example, corresponding to the feature data of the target object comprising at least feature data in two dimensions of imaging content and color bar, in the multi-dimensional detection, it is necessary to compare the feature data comprising at least two dimensions of imaging content and color bar with at least the imaging content indicator and the color bar indicator, respectively, thereby obtaining the detection result through the multi-dimensional detection.

With this disclosure, the acquisition processing is performed on the to-be-detected imaging image to obtain the acquired image; in response to detection processing, the feature data of the target object in the acquired image is extracted through the preset image detection network. A multi-dimensional detection comprising at least an imaging content indicator and a color bar indicator is performed on the feature data of the target object according to the image detection network to obtain a detection result. A more accurate detection result can be obtained by adopting a multi-dimensional detection comprising at least an imaging content indicator and a color bar indicator for the target object since the target object comprises imaging contents and color bars which are used to describe color information related to the imaging contents. In other words, by performing the multi-dimensional detection in the present disclosure, detection of the imaging content and color acquired by the acquisition device (such as a camera or a car machine) can be realized without additional cost (such as setting a specific detection environment), and it is in line with hardware-in-loop, thereby improving detection accuracy of image (imaging content and color) detection of the imaging image output by the acquisition device such as the camera or car machine.

In one embodiment, the performing a multi-dimensional detection of an imaging content indicator and a color bar indicator on the feature data of the target object according to the image detection network to obtain a detection result comprises: performing a multi-dimensional identification of at least the imaging contents and the color bars on the feature data of the target object according to the image detection network to obtain an identification result; performing a multi-dimensional comparison between the identification result and a target verification value according to the image detection network, and a detection result that the verification of the imaging image is successful is obtained in a case that the identification result is consistent with the target verification value. Among them, the target verification value is used to represent the imaging content indicator and the color bar indicator.

With this embodiment, through the multi-dimensional comparison between the identification result and the target verification value, it can be evaluated whether the imaging content of the foregoing acquired image is distorted, whether there is significant deformation in the imaging content, whether a saturation of the color bar is affected by influence such as light, whether colors of the color bar match an output display of the acquisition device, and whether the color is distorted, etc. If the identification result is consistent with the target verification value, the detection result is that an imaging quality of the acquired image is intact.

In one example, if the detection result is that the imaging quality is intact, then, based on the detection result, a verification result that the acquisition device (such as the camera or the car machine) is in a normal operation state may further be obtained. Taking the imaging content as a human face as an example, when the acquisition device is in a normal operation state, only one human face can be obtained, and the position and the area size, etc. of the human face are unchanged (that is to say, meeting the foregoing target verification value), as well as the color of the human face is not interfered by an acquisition environment such as light. For a color bar of the human face, the color bar may be set to comprise the three primary colors of "red, green and blue". When the acquisition device is in the normal operation state, the position and the area size of each color of the three primary colors are unchanged (that is to say, meeting the foregoing target verification value). When the acquisition device is in an abnormal operation state, multiple human faces (that is, the number of human faces is changed) may be detected, or the position and the area size of the human face in the acquired image may also change.

In one embodiment, the performing a multi-dimensional identification of at least the imaging content and the color bar on the feature data of the target object according to the image detection network to obtain an identification result comprises: obtaining first feature data for representing image feature data corresponding to the imaging contents; obtaining second feature data for representing color feature data corresponding to the color bars; identifying the first feature data and the second feature data respectively based on respective identification dimension parameters thereof to obtain the identification result.

In one embodiment, the identifying the first feature data and the second feature data respectively based on respective identification dimension parameters thereof to obtain the identification result comprises: identifying the first feature data based on at least one of the identification dimension parameters comprising at least the number of the imaging contents, the area of the imaging contents and the location of the imaging contents to obtain a first identification result; identifying the second feature data based on at least one of the identification dimension parameters comprising at least the number of the color bars, the area of the color bars and the location of the color bars to obtain a second identification result; obtaining the identification result according to the first identification result and the second identification result.

In one embodiment, the performing a multi-dimensional comparison between the identification result and a target verification value according to the image detection network comprises: obtaining at least one of the comparison dimension parameters comprising at least the number indicator of the imaging contents, the area indicator of the imaging contents and the location indicator of the imaging contents and performing a comparison processing between the identification result and the comparison dimension parameters in response to the comparison processing in which the target verification value is used to represent the imaging content indicator; obtaining at least one of the comparison dimension parameters comprising at least the number indicator of the color bars, the area indicator of the color bars and the location indicator of the color bars and performing a comparison processing between the identification result and the comparison dimension parameters in response to the comparison processing in which the target verification value is used to represent the color bar indicator. The comparison processing between the identification result and the target verification value may be a pixel-level comparison processing.

In one embodiment, the performing an acquisition processing on a to-be-detected imaging image to obtain an acquired image comprises: obtaining at least two acquired images in response to an image dynamic acquisition processing for the same imaging image; wherein the imaging contents and the color bars are distributed in different locations in the at least two acquired images. The location distribution of the imaging contents and the color bars may be randomly set in four directions of up, down, left, and right. Taking two acquired images obtained from an identical imaging image as an example, for instance, in one acquired image, the imaging content is on the left, and the location of the color bar is on the right; for another instance, in the other acquired image, the imaging content is on the right, and the location of the color bar is on the left. Further, locations of the three primary colors of "red, green and blue" in the color bar may also be randomly set.

Correspondingly, at least two image detection networks may be set up, and a multi-dimensional detection may be performed on the at least two acquired images respectively to obtain at least two detection results.

With this embodiment, at least two detection results may be obtained through multiple detections on at least two acquired images obtained from the identical imaging image, and a detection result with detection accuracy higher than a threshold value may be selected from the at least two detection results and taken as the target detection result, thereby not only improving the detection accuracy, but also improving detection speed by submitting the at least two acquired images to the at least two image detection networks for multiple detections.

In one embodiment, the method further comprises: acquiring an object comprising at least an imaging content training object and a color bar training object in the imaging image as a training sample; obtaining pre-annotated annotation data comprising at least imaging content annotation data and color bar annotation data; obtaining a multi-dimensional detection indicator comprising at least an imaging content indicator and a color bar indicator; training a convolutional neural network according to the training sample, the annotation data and the multi-dimensional detection indicator to obtain a trained convolutional neural network, and taking the trained convolutional neural network as the image detection network.

With this embodiment, the application of the image detection network can improve detection accuracy and detection speed. The image detection network can realize identification and comparison in the process of performing image detection. The image detection network may be a network module, or may be divided into a feature identification network module and a feature comparison network module. Or, the image detection network may be used to perform identification and not perform comparison, and other non-artificial intelligence comparison modes can be used.

Application Example

Processing procedures of an application example of one embodiment of the present disclosure comprise the following contents.

Figure 3:
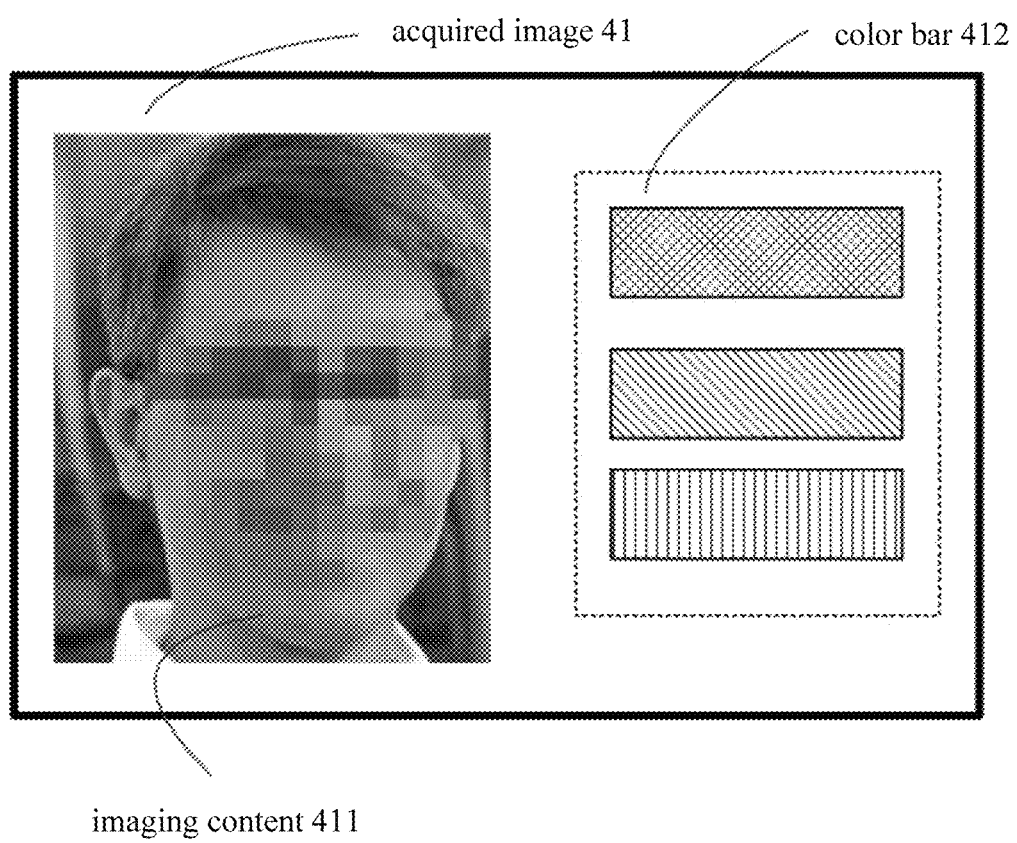
FIG. 3 is a schematic diagram of a target object of an application example of image detection according to an embodiment of the present disclosure.

FIG. 3 is a schematic diagram of a target object of an application example of image detection according to an embodiment of the present disclosure. As shown in FIG. 3, an acquired image 41 comprises imaging content 411 and a color bar 412. The color bar 412 is composed of at least the three primary colors "red, green and blue". As shown in FIG. 3, taking the three primary colors as an example, different shadow fillers are used to represent the three primary colors. A to-be-detected imaging image may be acquired by a camera to obtain imaging content therein, such as a human face (which may be black and white). The human face and the color bar containing the three primary colors are synthesized on a piece of paper. The camera or car machine is aimed at the paper to perform detection on the imaging content and the color bar according to a way of artificial intelligence (for example, through an image detection network). Specifically, faces and color bars are identified; the number and area of human faces and color bars, and coordinates used for location identification are compared, to ensure that an identification result is completely consistent with the expected target verification value, thereby ensuring that the imaging quality is intact. For example, there is a human face on a paper (the size and the number of human faces may be set arbitrarily), coordinates are x, y; and an area is Z. A color bar is red, green and blue (the size and the number of colors may be set arbitrarily). By analyzing a human face and a color bar in an acquired image acquired by the camera, and comparing with preset number and area of human faces and color bars, as well as coordinates used for location identification, it can be determined whether the imaging quality of the acquired image acquired by the camera is proper. If the imaging content is damaged, it will affect the detection accuracy of human face identification and comparison. If there is a color problem, the number and area as well as coordinates of the color bar will definitely change and be inconsistent with expectations.

Processing procedures of another application example of one embodiment of the present disclosure comprise the following contents.

Figure 4:
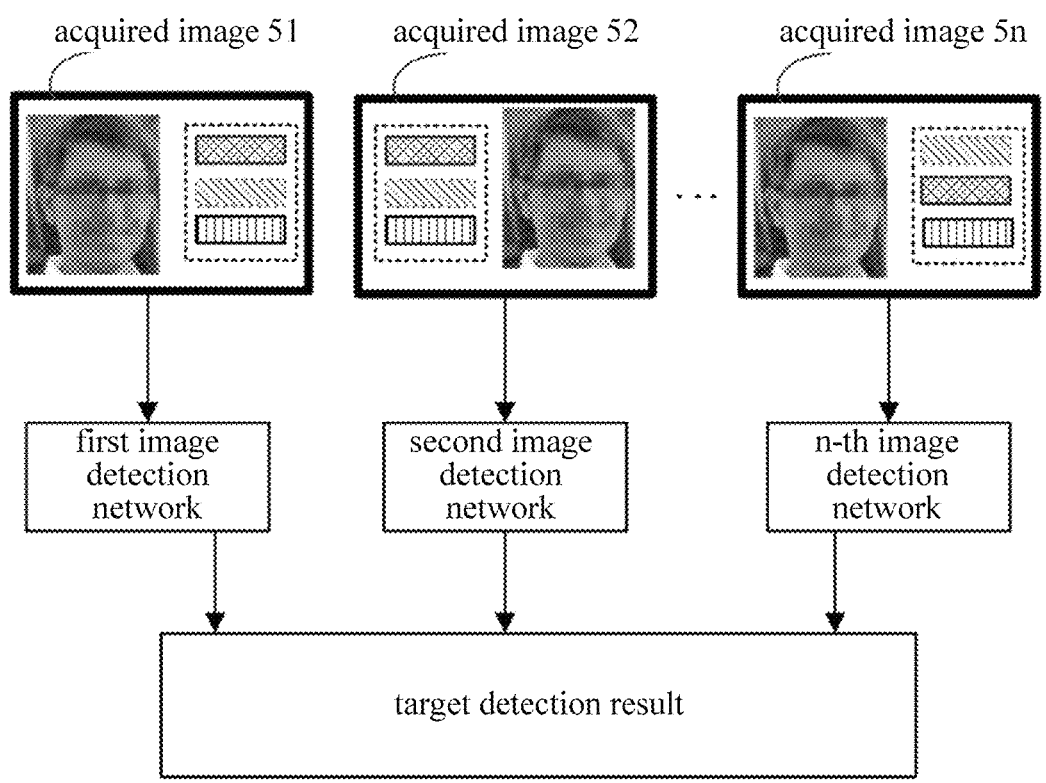
FIG. 4 is a schematic diagram of a target object of another application example of image detection according to an embodiment of the present disclosure.

FIG. 4 is a schematic diagram of a target object of another application example of image detection according to an embodiment of the present disclosure, which shows multiple acquired images (i.e., acquired images 51-5$n$). Each acquired image comprises an imaging content and a color bar. The color bar is composed of at least the three primary colors "red, green and blue". As shown in FIG. 4, taking the three primary colors as an example, different shadow fillers are used to represent the three primary colors. The location distribution of the imaging content and the color bar, and the location distribution of the three primary colors in the color bar may be set arbitrarily. This application example is a scene of dynamically acquiring images, which is mainly suitable for devices such as car machines that dynamically output imaging contents. The imaging contents and color bars output by the car machine will continuously change locations to obtain multiple acquired images. Identification processing and comparison detection processing are performed on the multiple acquired images according to the detection principle described in FIG. 3 (not repeated), and the detection processing may be performed respectively by multiple image detection networks (such as a first image detection network to an n-th image detection network). Further, a target detection result may be selected from obtained multiple detection processing results and taken as a final detection result, thereby not only improving the detection accuracy, but also improving detection speed.

Figure 5:
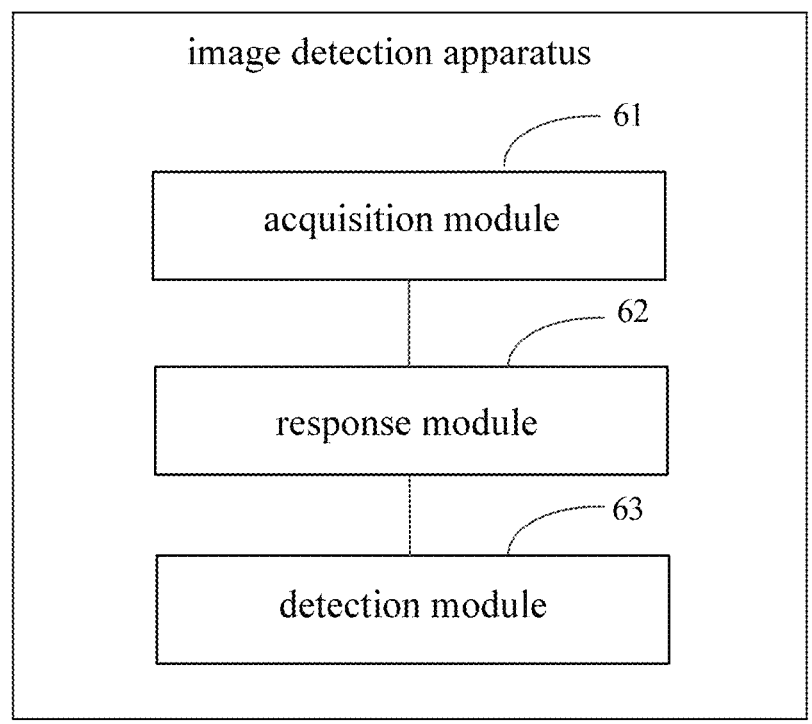
FIG. 5 is a schematic diagram showing structures of an image detection apparatus according to an embodiment of the present disclosure.

According to one embodiment of the present disclosure, an image detection apparatus is provided. FIG. 5 is a schematic diagram showing structures of an image detection apparatus according to an embodiment of the present disclosure. As shown in FIG. 5, the apparatus comprises: an acquisition module 61 configured to perform an acquisition processing on a to-be-detected imaging image to obtain an acquired image; a response module 62 configured to extract feature data of a target object in the acquired image through a preset image detection network in response to detection processing; a detection module 63 configured to perform a multi-dimensional detection comprising at least an imaging content indicator and a color bar indicator on the feature data of the target object according to the image detection network to obtain a detection result. Among them, the target object comprises imaging contents and color bars which are used to describe color information related to the imaging contents.

In one embodiment, the detection module comprises: an identification sub-module configured to perform a multi-dimensional identification comprising at least the imaging contents and the color bars on the feature data of the target object according to the image detection network to obtain an identification result; a comparison sub-module configured to perform a multi-dimensional comparison between the identification result and a target verification value according to the image detection network, and a detection result that the verification of the imaging image is successful is obtained in a case that the identification result is consistent with the target verification value. Among them, the target verification value is used to represent the imaging content indicator and the color bar indicator.

In one embodiment, the identification sub-module comprises: a first obtaining sub-module configured to obtain first feature data for representing image feature data corresponding to the imaging contents; a second obtaining sub-module configured to obtain second feature data for representing color feature data corresponding to the color bars; a parameter identification sub-module configured to identify the first feature data and the second feature data respectively based on respective identification dimension parameters thereof to obtain the identification result.

In one embodiment, the parameter identification sub-module is configured to identify the first feature data based on at least one of the identification dimension parameters comprising at least the number of the imaging contents, the area of the imaging contents and the location of the imaging contents to obtain a first identification result; identify the second feature data based on at least one of the identification dimension parameters comprising at least the number of the color bars, the area of the color bars and the location of the color bars to obtain a second identification result; obtain the identification result according to the first identification result and the second identification result.

In one embodiment, wherein the comparison sub-module is configured to obtain at least one of the comparison dimension parameters comprising at least the number indicator of the imaging contents, the area indicator of the imaging contents and the location indicator of the imaging contents and perform a comparison processing between the identification result and the comparison dimension parameters in response to the comparison processing in which the target verification value is used to represent the imaging content indicator; obtain at least one of the comparison dimension parameters comprising at least the number indicator of the color bars, the area indicator of the color bars and the location indicator of the color bars and perform a comparison processing between the identification result and the comparison dimension parameters in response to the comparison processing in which the target verification value is used to represent the color bar indicator.

In one embodiment, the acquisition module is configured to obtain at least two acquired images in response to an image dynamic acquisition processing for the same imaging image; wherein the imaging contents and the color bars are distributed in different locations in the at least two acquired images.

In one embodiment, the apparatus further comprises a dynamic detection module configured to set up at least two image detection networks, and perform a multi-dimensional detection on the at least two acquired images respectively to obtain at least two detection results; select a detection result with detection accuracy higher than a threshold value from the at least two detection results as a target detection result.

In one embodiment, the device further comprises a training module configured to acquire an object comprising at least an imaging content training object and a color bar training object in the imaging image as a training sample; obtain pre-annotated annotation data comprising at least imaging content annotation data and color bar annotation data; obtain a multi-dimensional detection indicator comprising at least an imaging content indicator and a color bar indicator; train a convolutional neural network according to the training sample, the annotation data and the multi-dimensional detection indicator to obtain a trained convolutional neural network, and take the trained convolutional neural network as the image detection network.

Functions of each module in each apparatus of the embodiment of the present disclosure may refer to the corresponding description in the foregoing method, and will not be repeated here.

According to the embodiments of the present disclosure, the present disclosure further provides an electronic device and a readable storage medium.

Figure 6:
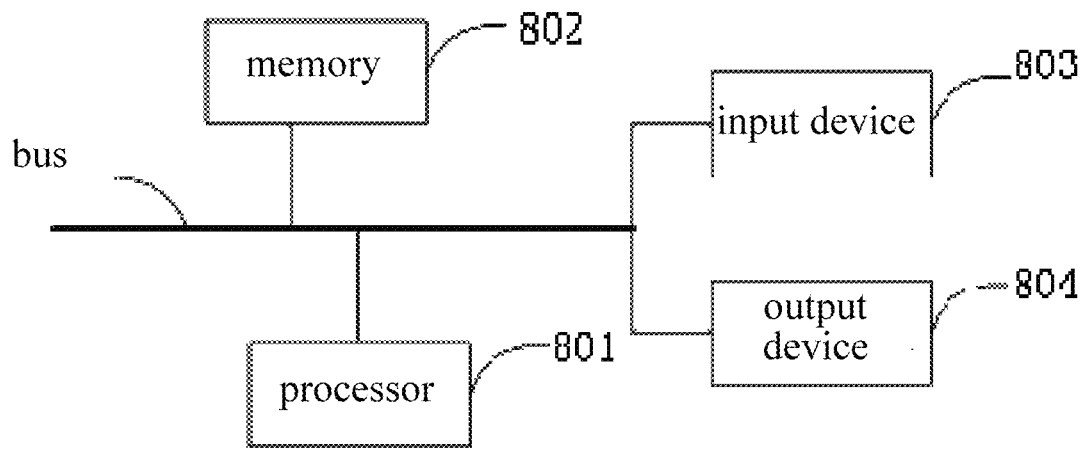
FIG. 6 is a block diagram of an electronic device used to implement an image detection method according to an embodiment of the present disclosure.

FIG. 6 is a block diagram of an electronic device used to implement an image detection method according to an embodiment of the present disclosure. The electronic device may be an aforementioned deployment device or proxy device. The electronic device is intended to represent various forms of digital computers, such as laptop computers, desktop computers, workstations, personal digital assistants, servers, blade servers, mainframe computers, and other suitable computers. The electronic device may also represent various forms of mobile devices, such as personal digital processing, cellular telephones, smart phones, wearable devices, and other similar computing devices. The components shown herein, connections and relationships therebetween, and functions thereof are merely used as examples, and are not intended to limit the implementations of the present disclosure described and/or claimed herein.

As shown in FIG. 6, the electronic device comprises: one or more processors 801, a memory 802, and interfaces for connecting various components, comprising high-speed interfaces and low-speed interfaces. The various components are interconnected using different buses and may be mounted on a common motherboard or mounted in other ways as desired. The processor may process instructions executed within the electronic device, comprising instructions stored in the memory or on the memory to display graphical information of a Graphical User Interface (GUI) on an external input/output device (e.g., a display device coupled to an interface). In other implementations, multiple processors and/or multiple buses and multiple memories may be used with multiple memories if desired. Similarly, multiple electronic devices may be connected, each providing part of the necessary operations (e.g., acting as an array of servers, a set of blade servers, or a multi-processor system). In FIG. 6, one processor 801 is taken as an example.

The memory 802 is a non-transitory computer-readable storage medium provided herein. The memory stores instructions executable by at least one processor to enable the at least one processor to perform the image detection method provided herein. The non-transitory computer-readable storage medium of the present disclosure stores computer instructions for enabling a computer to perform the image detection method provided herein.

As a non-transitory computer-readable storage medium, the memory 802 may be configured to store non-transitory software programs, non-transitory computer-executable programs and modules, such as program instructions/modules (e.g., the acquisition module, the response module, the detection module shown in FIG. 5) corresponding to the image detection method of embodiments of the present disclosure. The processor 801 executes various functional applications and data processing of the server, i.e., the image detection method in the above-mentioned method embodiments, by running the non-transitory software programs, instructions, and modules stored in the memory 802.

The memory 802 may comprise a program storage area and a data storage area, wherein the program storage area may store an application program required by an operating system and at least one function; and the data storage area may store data created according to the use of the electronic device. In addition, the memory 802 may comprise a high-speed random-access memory, and may also comprise a non-transitory memory, such as at least one magnetic disk memory device, a flash memory device, or other non-transitory solid state memory device. In some embodiments, the memory 802 optionally comprises memories remotely located relative to the processor 801, and these remote memories may be connected to the electronic device via a network. Examples of the network include, but are not limited to, the Internet, an intranet, a local area network, a mobile communication network, and combinations thereof.

The electronic device for implementing the image detection method may further comprise: an input device 803 and an output device 804. The processor 801, the memory 802, the input device 803, and the output device 804 may be connected via buses or in other ways, and the bus connection is taken as an example in FIG. 6.

The input device 803 may receive input numeric or character information and generate key signal inputs related to user settings and functional controls of the electronic device, such as input devices comprising a touch screen, a keypad, a mouse, a track pad, a touch pad, an indicator stick, one or more mouse buttons, a trackball, a joystick, etc. The output device 804 may comprise a display device, an auxiliary lighting apparatus (e.g., a Light-Emitting Diode (LED)), tactile feedback device (e.g., a vibration motor), and the like. The display device may include, but is not limited to, a Liquid Crystal Display (LCD), a LED display, and a plasma display. In some implementations, the display device may be a touch screen.

Various implementations of the systems and techniques described herein may be implemented in digital electronic circuit systems, an integrated circuit system, an Application Specific Integrated Circuits (ASICs), computer hardware, firmware, software, and/or combinations thereof. These various implementations may include implementations implemented in one or more computer programs executable and/or interpretable on a programmable system including at least one programmable processor, and the programmable processor may be a dedicated or general-purpose programmable processor which can receive data and instructions from, and transmit data and instructions to, a memory system, at least one input device, and at least one output device.

These computing programs (also referred to as programs, software, software applications, or codes) comprise machine instructions of a programmable processor, and may be implemented using high-level procedural and/or object-oriented programming languages, and/or assembly/machine languages. As used herein, the terms "machine-readable medium" and "computer-readable medium" refer to any computer program product, device, and/or apparatus (e.g., a magnetic disk, an optical disk, a memory, and a programmable logic device (PLD)) for providing machine instructions and/or data to a programmable processor, comprising a machine-readable medium that receives machine instructions as machine-readable signals. The term "machine-readable signal" refers to any signal used to provide machine instructions and/or data to a programmable processor.

In order to provide an interaction with a user, the systems and techniques described herein may be implemented on a computer having a display device (e.g., a Cathode Ray Tube (CRT) or a Liquid Crystal Display (LCD) monitor) for displaying information to a user; and a keyboard and a pointing device (e.g., a mouse or a trackball) by which a user can provide an input to the computer. Other types of devices may also be used to provide an interaction with a user; for example, the feedback provided to the user may be any form of sensory feedback (e.g., a visual feedback, an audible feedback, or a tactile feedback); and the input from the user may be received in any form (comprising an acoustic input, a audio input, or a tactile input).

The systems and techniques described herein may be implemented in a computing system that comprises a background component (e.g., acting as a data server), or a computing system that comprises a middleware component (e.g., an application server), or a computing system that comprises a front-end component (e.g., a user computer having a graphical user interface or a web browser through which a user may interact with the implementations of the systems and techniques described herein), or in a computing system that comprises any combination of such background component, middleware component, or front-end component. The components of the system may be interconnected by digital data communication (e.g., a communication network) of any form or medium. Examples of the communication network comprise a Local Area Networks (LAN), a Wide Area Network (WAN), and the Internet.

The computer system may comprise a client and a server. The client and the server are generally remote from each other and usually interact through a communication network. The relationship between the client and the server is generated by computer programs running on respective computers and having a client-server relationship with each other.

With this disclosure, the acquisition processing is performed on the to-be-detected imaging image to obtain the acquired image; in response to detection processing, the feature data of the target object in the acquired image can be extracted through the preset image detection network. A multi-dimensional detection comprising at least an imaging content indicator and a color bar indicator can be performed on the feature data of the target object according to the image detection network to obtain a detection result. A more accurate detection result can be obtained by adopting a multi-dimensional detection comprising at least an imaging content indicator and a color bar indicator for the target object since the target object comprises imaging contents and color bars which are used to describe color information related to the imaging contents. In other words, detection accuracy of image (imaging content and color) detection of the imaging images output by the acquisition devices such as cameras or car machines can be improved.

It should be understood that the steps may be reordered, added or deleted using the various forms of flows as illustrated above. For example, the steps described in the present disclosure may be performed concurrently, sequentially or in a different order, as long as the desired result of the technical solution disclosed in the present disclosure can be achieved, and no limitation is made herein.

The specific implementations above are not to be construed as limiting the protection scope of the present disclosure. It should be understood by those skilled in the art that various modifications, combinations, sub-combinations and substitutions can be made according to the design requirements and other factors. Any modification, equivalent replacement and improvement made under the spirit and principle of the present disclosure should fall within the protection scope of the present disclosure.

What is claimed is:

1. An image detection method, comprising:
performing an acquisition processing on a to-be-detected imaging image to obtain an acquired image;
extracting feature data of a target object in the acquired image through a preset image detection network in response to detection processing; and
performing a multi-dimensional detection comprising at least an imaging content indicator and a color bar indicator on the feature data of the target object according to the image detection network to obtain a detection result,
wherein the target object comprises imaging contents and color bars which are used to describe color information related to the imaging contents;
wherein the performing an acquisition processing on a to-be-detected imaging image to obtain an acquired image comprises:
obtaining at least two acquired images in response to an image dynamic acquisition processing for the same imaging image,
wherein the imaging contents and the color bars are distributed in different locations in the at least two acquired images,
wherein the method further comprises:
setting up at least two image detection networks, and performing a multi-dimensional detection on the at least two acquired images respectively to obtain at least two detection results; and
selecting a detection result with detection accuracy higher than a threshold value from the at least two detection results as a target detection result.

2. The method according to claim 1, wherein the performing a multi-dimensional detection of an imaging content indicator and a color bar indicator on the feature data of the target object according to the image detection network to obtain a detection result comprises:
performing a multi-dimensional identification comprising at least the imaging contents and the color bars on the feature data of the target object according to the image detection network to obtain an identification result; and
performing a multi-dimensional comparison between the identification result and a target verification value according to the image detection network, and a detection result that the verification of the imaging image is successful is obtained in a case that the identification result is consistent with the target verification value,
wherein the target verification value is used to represent the imaging content indicator and the color bar indicator.

3. The method according to claim 2, wherein the performing a multi-dimensional identification comprising at least the imaging content and the color bar on the feature data of the target object according to the image detection network to obtain an identification result comprises:
obtaining first feature data for representing image feature data corresponding to the imaging contents;
obtaining second feature data for representing color feature data corresponding to the color bars; and
identifying the first feature data and the second feature data respectively based on respective identification dimension parameters thereof to obtain the identification result.

4. The method according to claim 3, wherein the identifying the first feature data and the second feature data respectively based on respective identification dimension parameters thereof to obtain the identification result comprises:
identifying the first feature data based on at least one of the identification dimension parameters comprising at least the number of the imaging contents, the area of the imaging contents and the location of the imaging contents to obtain a first identification result;
identifying the second feature data based on at least one of the identification dimension parameters comprising at least the number of the color bars, the area of the color bars and the location of the color bars to obtain a second identification result; and
obtaining the identification result according to the first identification result and the second identification result.

5. The method according to claim 2, wherein the performing a multi-dimensional comparison between the identification result and a target verification value according to the image detection network comprises:
obtaining at least one of the comparison dimension parameters comprising at least the number indicator of the imaging contents, the area indicator of the imaging contents and the location indicator of the imaging contents and performing a comparison processing between the identification result and the comparison dimension parameters in response to the comparison processing in which the target verification value is used to represent the imaging content indicator; and
obtaining at least one of the comparison dimension parameters comprising at least the number indicator of the color bars, the area indicator of the color bars and the location indicator of the color bars and performing a comparison processing between the identification result and the comparison dimension parameters in response to the comparison processing in which the target verification value is used to represent the color bar indicator.

6. The method according to claim 1, further comprising:
acquiring an object comprising at least an imaging content training object and a color bar training object in the imaging image as a training sample;
obtaining pre-annotated annotation data comprising at least imaging content annotation data and color bar annotation data;
obtaining a multi-dimensional detection indicator comprising at least an imaging content indicator and a color bar indicator; and
training a convolutional neural network according to the training sample, the annotation data and the multi-dimensional detection indicator to obtain a trained convolutional neural network, and taking the trained convolutional neural network as the image detection network.

7. An image detection apparatus, comprising:
a processor and a memory for storing one or more computer programs executable by the processor,
wherein when executing at least one of the computer programs, the processor is configured to perform operations comprising:
performing an acquisition processing on a to-be-detected imaging image to obtain an acquired image;
extracting feature data of a target object in the acquired image through a preset image detection network in response to detection processing; and
performing a multi-dimensional detection comprising at least an imaging content indicator and a color bar indicator on the feature data of the target object according to the image detection network to obtain a detection result, wherein the target object comprises imaging contents and color bars which are used to describe color information related to the imaging contents, wherein the performing an acquisition processing on a to-be-detected imaging image to obtain an acquired image comprises:

obtaining at least two acquired images in response to an image dynamic acquisition processing for the same imaging image, wherein the imaging contents and the color bars are distributed in different locations in the at least two acquired images, wherein when executing at least one of the computer programs, the processor is further configured to perform operations comprising:

setting up at least two image detection networks, and perform a multi-dimensional detection on the at least two acquired images respectively to obtain at least two detection results; and selecting a detection result with detection accuracy higher than a threshold value from the at least two detection results as a target detection result.

8. The apparatus according to claim 7, wherein the performing a multi-dimensional detection of an imaging content indicator and a color bar indicator on the feature data of the target object according to the image detection network to obtain a detection result comprises:

performing a multi-dimensional identification comprising at least the imaging contents and the color bars on the feature data of the target object according to the image detection network to obtain an identification result; and performing a multi-dimensional comparison between the identification result and a target verification value according to the image detection network, and a detection result that the verification of the imaging image is successful is obtained in a case that the identification result is consistent with the target verification value, wherein the target verification value is used to represent the imaging content indicator and the color bar indicator.

9. The apparatus according to claim 8, wherein the performing a multi-dimensional identification comprising at least the imaging content and the color bar on the feature data of the target object according to the image detection network to obtain an identification result comprises:

obtaining first feature data for representing image feature data corresponding to the imaging contents;

obtaining second feature data for representing color feature data corresponding to the color bars; and identifying the first feature data and the second feature data respectively based on respective identification dimension parameters thereof to obtain the identification result.

10. The apparatus according to claim 9, wherein the identifying the first feature data and the second feature data respectively based on respective identification dimension parameters thereof to obtain the identification result comprises:

identifying the first feature data based on at least one of the identification dimension parameters comprising at least the number of the imaging contents, the area of the imaging contents and the location of the imaging contents to obtain a first identification result;

identifying the second feature data based on at least one of the identification dimension parameters comprising at least the number of the color bars, the area of the color bars and the location of the color bars to obtain a second identification result; and obtaining the identification result according to the first identification result and the second identification result.

11. The apparatus according to claim 8, wherein the performing a multi-dimensional comparison between the identification result and a target verification value according to the image detection network comprises:

obtaining at least one of the comparison dimension parameters comprising at least the number indicator of the imaging contents, the area indicator of the imaging contents and the location indicator of the imaging contents and perform a comparison processing between the identification result and the comparison dimension parameters in response to the comparison processing in which the target verification value is used to represent the imaging content indicator; and obtaining at least one of the comparison dimension parameters comprising at least the number indicator of the color bars, the area indicator of the color bars and the location indicator of the color bars and perform a comparison processing between the identification result and the comparison dimension parameters in response to the comparison processing in which the target verification value is used to represent the color bar indicator.

12. The apparatus according to claim 7, wherein when executing at least one of the computer programs, the processor is further configured to perform operations comprising:

acquiring an object comprising at least an imaging content training object and a color bar training object in the imaging image as a training sample;

obtaining pre-annotated annotation data comprising at least imaging content annotation data and color bar annotation data;

obtaining a multi-dimensional detection indicator comprising at least an imaging content indicator and a color bar indicator; and training a convolutional neural network according to the training sample, the annotation data and the multi-dimensional detection indicator to obtain a trained convolutional neural network, and take the trained convolutional neural network as the image detection network.

13. A non-transitory computer-readable storage medium storing computer instructions for causing the computer to perform operations comprising:

performing an acquisition processing on a to-be-detected imaging image to obtain an acquired image;

extracting feature data of a target object in the acquired image through a preset image detection network in response to detection processing; and performing a multi-dimensional detection comprising at least an imaging content indicator and a color bar indicator on the feature data of the target object according to the image detection network to obtain a detection result, wherein the target object comprises imaging contents and color bars which are used to describe color information related to the imaging contents, wherein the performing an acquisition processing on a to-be-detected imaging image to obtain an acquired image comprises:

obtaining at least two acquired images in response to an image dynamic acquisition processing for the same imaging image,
wherein the imaging contents and the color bars are distributed in different locations in the at least two acquired images,
wherein the operations further comprise:
setting up at least two image detection networks, and perform a multi-dimensional detection on the at least two acquired images respectively to obtain at least two detection results; and
selecting a detection result with detection accuracy higher than a threshold value from the at least two detection results as a target detection result.

14. The non-transitory computer-readable storage medium according to claim 13, wherein the performing a multi-dimensional detection of an imaging content indicator and a color bar indicator on the feature data of the target object according to the image detection network to obtain a detection result comprises:
performing a multi-dimensional identification comprising at least the imaging contents and the color bars on the feature data of the target object according to the image detection network to obtain an identification result; and
performing a multi-dimensional comparison between the identification result and a target verification value according to the image detection network, and a detection result that the verification of the imaging image is successful is obtained in a case that the identification result is consistent with the target verification value, wherein the target verification value is used to represent the imaging content indicator and the color bar indicator.

15. The non-transitory computer-readable storage medium according to claim 14, wherein the performing a multi-dimensional identification comprising at least the imaging content and the color bar on the feature data of the target object according to the image detection network to obtain an identification result comprises:
obtaining first feature data for representing image feature data corresponding to the imaging contents;
obtaining second feature data for representing color feature data corresponding to the color bars; and
identifying the first feature data and the second feature data respectively based on respective identification dimension parameters thereof to obtain the identification result.

16. The non-transitory computer-readable storage medium according to claim 15, wherein the identifying the first feature data and the second feature data respectively based on respective identification dimension parameters thereof to obtain the identification result comprises:
identifying the first feature data based on at least one of the identification dimension parameters comprising at least the number of the imaging contents, the area of the imaging contents and the location of the imaging contents to obtain a first identification result;
identifying the second feature data based on at least one of the identification dimension parameters comprising at least the number of the color bars, the area of the color bars and the location of the color bars to obtain a second identification result; and
obtaining the identification result according to the first identification result and the second identification result.

* * * * *